Patented Jan. 13, 1948

2,434,606

UNITED STATES PATENT OFFICE 2,434,606

METHOD OF PREPARING SUCCINONITRILE

Erwin L. Carpenter, Riverside, Conn., assignor to American Cyanamid Company, New York, N. Y., a corporation of Maine No Drawing. Application August 18, 1945, Serial No. 611,451. In Canada February 2, 1942

20 Claims. (Cl. 260—464)

The present invention relates to the production of succinonitrile, and more particularly to a method of preparing succinonitrile from acrylonitrile and hydrocyanic acid.

Acrylonitrile and hydrocyanic acid alone do not react together to produce succinonitrile. For instance, a mixture of equimolecular quantities of hydrocyanic acid and acrylonitrile after standing at room temperature for 3 days gave no indication of a reaction. Another mixture of equimolecular quantities of hydrocyanic acid and acrylonitrile was heated under reflux for 3 hours with no detectable change. A further run was carried out in which redistilled hydrocyanic acid and acrylonitrile, 27.5 parts by weight of the former and 53 parts of the latter, were heated in a stainless steel bomb at 115° C for a period of 4 hours. The run was repeated at a temperature of 250° C. No succinonitrile was obtained at these elevated temperatures.

It has been discovered however, that hydrocyanic acid may be reacted with acrylonitrile in the presence of an alkaline condensing agent to yield succinonitrile.

Suitable alkaline condensing agents for the reaction are the alkali metal hydroxides, carbonates and cyanides such as the potassium, sodium or lithium hydroxides, carbonates and cyanides, the alkaline earth metal oxides and hydroxides such as the calcium, barium or strontium oxides and hydroxides, aliphatic amines such as the low molecular weight secondary and tertiary alkyl amines, heterocyclic amines, and quaternary ammonium hydroxides such as trimethyl benzyl ammonium hydroxide, triethyl benzyl ammonium hydroxide or dimethyl dibenzyl ammonium hydroxide. The amount of alkaline condensing agent which may be used may vary from about 0.5% to about 15% of the combined weights of the reactants.

The reaction may be performed with or without the use of an inert liquid diluent or solvent such as for example, benzene, toluene, hexane, dioxane and the like.

The reaction is advantageously carried out at temperatures within the range of 30° C. to about 80° C., and usually at atmospheric pressure. Somewhat higher temperatures and pressures above atmospheric may be used however, particularly to complete the reaction when using a relatively weak alkaline condensing agent. The temperature may be controlled if necessary by external cooling.

The following examples in which the parts are by weight further illustrate the invention.

Example 1

2 parts of potassium cyanide and 1 part of hydroquinone (polymerization inhibitor) were added to a solution of 160 parts of acrylonitrile in 90 parts of benzene in a vessel equipped with a stirrer and inlet tubes for hydrocyanic acid and acrylonitrile. 78 parts of vaporized hydrocyanic acid were then passed into this mixture over a period of 90 minutes while maintaining the temperature at 30° to 35° C. with the aid of a water bath. The temperature of the reaction mixture was gradually increased to 45° C. and held there for 4 hours after which it was allowed to cool slowly to room temperature. Sufficient sulfuric acid was added to neutralize the reaction mass which was then fractionally distilled under reduced pressure to yield 202.2 parts of crude succinonitrile boiling at 110°–120° C./1–2 mm. pressure. Redistillation of the product under vacuum gave a clear, colorless liquid boiling at 106° to 107° C./1 to 1.5 mm. Upon cooling to room temperature, the purified product solidified into a white wax-like material having a melting point of about 55° C.

Example 2

63 parts of gaseous hydrocyanic acid were added during the course of 1½ hours to a well stirred mixture of 106 parts of acrylonitrile, 130 parts of water, and 15 parts of calcium hydroxide. After the addition of the acid, the mixture was maintained at about 70° C. for 1¼ hours. The reaction mixture was then cooled to room temperature, filtered, the filter cake washed with hot water, and the combined filtrate and wash liquor carbonated with Dry Ice to a pH below 7. The resultant slurry was filtered, and the filtrate vacuum distilled. 130.3 parts (79.5% yield) of succinonitrile were obtained. The purity of the product was 97.2%.

Example 3

55.3 parts of gaseous hydrocyanic acid were added during the course of 45 minutes to a well stirred mixture of 106 parts of acrylonitrile, 130 parts of water and 5 parts of potassium hydroxide. After the addition of the acid, the mixture was maintained at about 50° C. for 3 hours. The reaction mixture was then cooled to room temperature, neutralized with sulfuric acid, and fractionally distilled under reduced pressure. 88.3 parts of succinonitrile were obtained. The purity of the product was 96.6%.

Example 4

A mixture consisting of 106 parts of acrylonitrile and 15 parts of tri-n-butylamine was placed in a reaction vessel equipped with a stirrer, thermometer, reflux condenser, and a cooled dropping-funnel. The mixture was stirred and heated to about 60° C. 55.3 parts of hydrocyanic acid were added slowly by means of the dropping-funnel during a period of 95 minutes, the addition being at a rate sufficient to keep the temperature of the reaction mixture at about 60° C. by the heat of reaction alone. Following the addition of the hydrocyanic acid, the reaction mixture was held at 60° C. for a period of 75 minutes by applying heat to the vessel. After standing overnight at room temperature, the resulting mixture was distilled under reduced pressure. The first fraction consisted of the tri-n-butyl-amine, distilling at about 107° C. at 34 mm. Thereafter, 142.1 parts of succinonitrile were obtained, distilling at 102 to 110° C. at 4 mm. pressure. The purity of the product was 98.5 per cent. The yield was 89 per cent of the theoretical, based on the quantity of acrylonitrile used.

The procedure of Example 4 was repeated in each of the examples listed in the following table.

| Example | Condensing Agent | Parts used of— | | | Yield of Succinonitrile | | Purity of Product, Per cent |
|---|---|---|---|---|---|---|---|
| | | HCN | CH₂=CHCN | Condensing Agent | Parts | Per cent | |
| 5 | Tri-n-propylamine | 81 | 159 | 16.5 | 227 | 94.5 | 99.4 |
| 6 | Tri-n-amylamine | 83 | 159 | 15.0 | 207 | 85.3 | 98.5 |
| 7 | Triethylamine | 138 | 265 | 20.0 | 380.5 | 95.2 | 99.1 |
| 8 | ....do | 83 | 159 | 1.8 | 230.2 | 96.0 | 99.5 |
| 9 | ....do | 86.5 | 159 | 3.1 | 225.4 | 94.0 | 99.5 |

Example 10

A mixture consisting of 106.2 parts of acrylonitrile and 3.7 parts of diisopropylamine was placed in a reaction vessel equipped with a stirrer, thermometer, reflux condenser, and a cooled dropping-funnel. The mixture was stirred and warmed to about 50° C. 55.5 parts of hydrocyanic acid were then added drop-wise over a period of 67 minutes, the temperature of the reaction mixture being held between 50 and 57° C. by occasional cooling. Following the addition of the acid, the reaction mixture was kept at about 55° C. for 1½ hours. Distillation of the product under vacuum gave 155 parts of succinonitrile having a purity of 98.3% (by Kjeldahl analysis). The yield (on acrylonitrile basis) was 95.2%.

Example 11

4.8 parts of trimethyl benzyl ammonium hydroxide (41% aqueous solution) were dissolved in 100 parts of succinonitrile warmed to 55° C. The solution was stirred and maintained at 55-60° C. while a mixture of 265 parts of acrylonitrile and 149 parts of hydrocyanic acid was added during a period of 160 minutes. The reaction mixture was stirred for 5 hours, then neutralized with sulfuric acid and distilled under vacuum. 489.3 parts of succinonitrile were obtained. The purity of the product was 99.4%.

Example 12

A mixture of 27 parts of hydrocyanic acid, 53 parts of acrylonitrile and 10 parts of pyridine was heated in a stainless steel bomb at 140° C. for a period of four hours. Distillation of the reaction product under vacuum gave 61.3 parts of succinonitrile having a purity of 99.3% (by Kjeldahl analysis).

The invention herein described affords a simple and economical method for the production of succinonitrile in good yield and of high purity. The product finds use as an intermediate in the manufacture of various materials such as, for example, plasticizing agents, lacquers, dyes and perfumes.

The present application is a continuation-in-part of copending application Serial No. 382,874, filed March 12, 1941.

While the invention has been described with particular reference to specific embodiments, it is to be understood that it is not to be limited thereto but is to be construed broadly and restricted solely by the scope of the appended claims.

I claim:

1. The method which comprises condensing hydrocyanic acid and acrylonitrile in the presence of an alkaline condensing agent to form succinonitrile.

2. Method of claim 1 in which the reaction is carried out at a temperature within the range of from 30° C. to about 80° C.

3. Method of claim 1 in which the alkaline condensing agent is present in an amount of from about 0.5% to about 15% of the combined weights of the reactants.

4. Method of claim 1 in which the reaction is carried out in an inert liquid diluent.

5. The method which comprises condensing hydrocyanic acid and acrylonitrile in the presence of an alkali metal cyanide to form succinonitrile.

6. The method which comprises condensing hydrocyanic acid and acrylonitrile in the presence of a quaternary ammonium hydroxide to form succinonitrile.

7. The method which comprises condensing hydrocyanic acid and acrylonitrile in the presence of an aliphatic amine to form succinonitrile.

8. A method of preparing succinonitrile which includes the steps of reacting hydrocyanic acid with acrylonitrile in the presence of triethylamine at a temperature within the range of 30 to 80° C., and recovering succinonitrile from the resulting mixture.

9. The method which comprises condensing hydrocyanic acid and acrylonitrile in the presence of an inert liquid diluent comprising succinonitrile, and an alkaline catalyst.

10. The process which comprises reacting acrylonitrile with hydrocyanic acid in the presence of a basic inorganic cyanide under anhydrous conditions and at a temperature of 30° C. to 55° C.

11. The process which comprises reacting acrylonitrile with hydrocyanic acid in the presence of a basic inorganic cyanide under anhydrous conditions in liquid phase and at a temperature of 30° C. to 55° C.

12. The process which comprises reacting acrylonitrile with hydrocyanic acid in the presence of a basic inorganic cyanide in an inert organic solvent and at a temperature of 30° to 55° C.

13. The process which comprises reacting acrylonitrile with hydrocyanic acid in the presence of a basic inorganic cyanide in the presence of benzene and at a temperature of 30° C. to 55° C.

14. The process which comprises reacting acrylonitrile with small portions of hydrocyanic acid in the presence of a basic inorganic cyanide under anhydrous conditions and at a temperature of 30° C. to 55° C.

15. The process which comprises reacting acrylonitrile with small portions of hydrocyanic acid in the presence of a basic inorganic cyanide under anhydrous conditions in the liquid phase and at a temperature of 30° C. to 55° C.

16. The process for preparing succinonitrile which comprises reacting acrylonitrile with hydrocyanic acid in the presence of an inorganic base as catalyst.

17. The process of preparing succinonitrile which comprises reacting acrylonitrile with hydrocyanic acid in liquid phase and at a temperature of at least 45° C. in the presence of an inorganic base.

18. The process of preparing succinonitrile which comprises reacting acrylonitrile with hydrocyanic acid in an inert organic solvent at a temperature of at least 45° C. in the presence of an inorganic base.

19. The process of preparing succinonitrile which comprises reacting acrylonitrile with hydrocyanic acid in the presence of benzene and at a temperature of at least 45° C. in the presence of an inorganic base.

20. The process for preparing succinonitrile which comprises reacting acrylonitrile with hydrocyanic acid in the presence of a basic inorganic cyanide and recovering the product by vacuum distillation.

ERWIN L. CARPENTER.

REFERENCES CITED

The following references are of record in the file of this patent:

UNITED STATES PATENTS

| Number | Name | Date |
|---|---|---|
| 2,397,341 | Ellingboe | Mar. 26, 1946 |
| 2,166,600 | Leupold et al. | June 18, 1939 |

OTHER REFERENCES

Wieland et al., Ber. Deut. Chem., vol. 63B, p. 405.

Comanducci, Chemical Abstracts, vol. 6, p. 3092 (1912).

Disclaimer 2,434,606—*Edwin L. Carpenter*, Riverside, Conn. METHOD OF PREPARING SUCCINONITRILE. Patent dated Jan. 13, 1948. Disclaimer filed Oct. 12, 1949, by the assignee, *American Cyanamid Company*.

Hereby enters this disclaimer to claims 1, 2, 3, 4, 6, 7, 8, and 9 of said patent.

[*Official Gazette November 8, 1949.*]

15. The process which comprises reacting acrylonitrile with small portions of hydrocyanic acid in the presence of a basic inorganic cyanide under anhydrous conditions in the liquid phase and at a temperature of 30° C. to 55° C.

16. The process for preparing succinonitrile which comprises reacting acrylonitrile with hydrocyanic acid in the presence of an inorganic base as catalyst.

17. The process of preparing succinonitrile which comprises reacting acrylonitrile with hydrocyanic acid in liquid phase and at a temperature of at least 45° C. in the presence of an inorganic base.

18. The process of preparing succinonitrile which comprises reacting acrylonitrile with hydrocyanic acid in an inert organic solvent at a temperature of at least 45° C. in the presence of an inorganic base.

19. The process of preparing succinonitrile which comprises reacting acrylonitrile with hydrocyanic acid in the presence of benzene and at a temperature of at least 45° C. in the presence of an inorganic base.

20. The process for preparing succinonitrile which comprises reacting acrylonitrile with hydrocyanic acid in the presence of a basic inorganic cyanide and recovering the product by vacuum distillation.

ERWIN L. CARPENTER.

REFERENCES CITED

The following references are of record in the file of this patent:

UNITED STATES PATENTS

| Number | Name | Date |
|---|---|---|
| 2,397,341 | Ellingboe | Mar. 26, 1946 |
| 2,166,600 | Leupold et al. | June 18, 1939 |

OTHER REFERENCES

Wieland et al., Ber. Deut. Chem., vol. 63B, p. 405.

Comanducci, Chemical Abstracts, vol. 6, p. 3092 (1912).

Disclaimer 2,434,606—*Edwin L. Carpenter*, Riverside, Conn. METHOD OF PREPARING SUCCINONITRILE. Patent dated Jan. 13, 1948. Disclaimer filed Oct. 12, 1949, by the assignee, *American Cyanamid Company*.

Hereby enters this disclaimer to claims 1, 2, 3, 4, 6, 7, 8, and 9 of said patent.

[*Official Gazette November 8, 1949.*]